(12) United States Patent
Vreugde et al.

(10) Patent No.: US 11,266,940 B2
(45) Date of Patent: Mar. 8, 2022

(54) VACUUM SYSTEM FOR REMOVING CAUSTIC PARTICULATE MATTER FROM VARIOUS ENVIRONMENTS

(71) Applicant: GLOBALFOUNDRIES U.S. Inc., Santa Clara, CA (US)

(72) Inventors: Charles Vreugde, Lake George, NY (US); Robert Baldino, Woodstock, CT (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 301 days.

(21) Appl. No.: 16/427,500

(22) Filed: May 31, 2019

(65) Prior Publication Data

US 2020/0376423 A1 Dec. 3, 2020

(51) Int. Cl.
| | |
|---|---|
| *B01D 46/00* | (2006.01) |
| *B01D 46/02* | (2006.01) |
| *B01D 46/10* | (2006.01) |
| *B01D 46/52* | (2006.01) |

(52) U.S. Cl.
CPC ..... *B01D 46/0023* (2013.01); *B01D 46/0004* (2013.01); *B01D 46/0047* (2013.01); *B01D 46/023* (2013.01)

(58) Field of Classification Search
CPC ........... B01D 46/0023; B01D 46/0004; B01D 46/0047; B01D 46/023; B01D 46/10; B01D 46/521; B01D 2271/022; B01D 2273/30
USPC ... 55/472, 476, 536, 385.2, 350.1, 323, 433, 55/DIG. 12; 95/287; 15/347
See application file for complete search history.

(56) References Cited

U.S. PATENT DOCUMENTS

| | | | |
|---|---|---|---|
| D215,874 S | 11/1969 | Averitt | |
| 4,411,254 A * | 10/1983 | Field | F24C 15/2042 |
| | | | 126/300 |
| 5,015,274 A | 5/1991 | Perry | |
| 5,069,691 A * | 12/1991 | Travis | A47L 5/38 |
| | | | 96/57 |
| 5,096,472 A | 3/1992 | Perry | |
| 5,145,496 A * | 9/1992 | Mellen | B01D 46/0046 |
| | | | 55/302 |
| 5,199,963 A | 4/1993 | Scarp | |
| 5,230,723 A * | 7/1993 | Travis | A47L 5/38 |
| | | | 55/323 |
| 5,281,246 A * | 1/1994 | Ray | B01D 46/002 |
| | | | 55/302 |
| 5,588,985 A * | 12/1996 | Shagott | A47L 5/38 |
| | | | 15/347 |
| 5,593,470 A * | 1/1997 | Shagott | A47L 5/38 |
| | | | 15/347 |
| 5,853,441 A * | 12/1998 | Groen | B01D 46/02 |
| | | | 55/350.1 |

(Continued)

*Primary Examiner* — Minh Chau T Pham
(74) *Attorney, Agent, or Firm* — Francois Pagette; Hoffman Warnick LLC

(57) ABSTRACT

One illustrative system disclosed herein includes an upper filter, a lower filter positioned vertically below the upper filter, at least one incoming air inlet positioned vertically above the upper filter, and a vacuum pump positioned vertically below the lower filter, the vacuum pump including an outlet, wherein an incoming air stream is adapted to flow downwardly through the at least one incoming air inlet, then through the upper filter, then through the lower filter and then out of the outlet of the vacuum pump where it exits as a cleaned air stream.

17 Claims, 4 Drawing Sheets

(56) References Cited

U.S. PATENT DOCUMENTS

| | | | |
|---|---|---|---|
| 6,607,573 B1 * | 8/2003 | Chaurushia | B01D 46/12 55/356 |
| 6,616,720 B1 * | 9/2003 | Smith | B08B 15/04 55/385.2 |
| 9,186,026 B2 | 11/2015 | Dondurur et al. | |
| 10,039,852 B2 * | 8/2018 | Yi | A61L 9/205 |
| 10,369,509 B2 * | 8/2019 | Vo | F24F 8/10 |
| 10,780,384 B2 * | 9/2020 | Guth | B01D 50/002 |

* cited by examiner though specific embodiments are not intended to limit the invention to the particular forms disclosed, but on the contrary, the intention is to cover all modifications, equivalents, and
VACUUM SYSTEM FOR REMOVING CAUSTIC PARTICULATE MATTER FROM VARIOUS ENVIRONMENTS

BACKGROUND

Field of the Disclosure

The present disclosure generally relates to a novel vacuum system for use in removing caustic particulate matter, e.g., caustic powders, from various environments, including, but not limited to, caustic particulate matter that may be present in manufacturing facilities involved in the fabrication of integrated circuit products.

Description of the Related Art

In many situations and industries, it is important to remove entrained solid particulate matter from the ambient air in a facility for a variety of reasons. In some applications, regulations may mandate that any air exhausted from a facility contain less than a certain quantity of entrained particulate matter (parts-per-million) of a given particle size. In other situations, where manufacturing operations are performed, the byproducts of such manufacturing may be harmful to humans and/or the environment and must be substantially removed from the manufacturing environment.

There are many vacuum-based particulate removal systems in the prior art for removing such entrained particulate matter in a stream of air. One such system includes a vacuum motor positioned at the top of the system and a bag filter positioned at the bottom of the system, wherein the system intakes air (that is to be cleaned) via a bottom inlet and exhausts relative cleaner air through the vacuum motor at the top of the system. That is, in this type of prior art system, the air flow is from bottom to top. Typically, the components of such systems are not made of materials that are resistant to caustic particulate matter that may be present in some environments. Additionally, due to the placement of the bag filter at the bottom of the system, there was typically a space or chamber above the bag filter where particulate matter that was still present in the air after it passed through the bag filter would collect on the sidewalls of the chamber. This collected particulate matter would have to be manually removed by maintenance personnel periodically, all of which increased costs and exposed maintenance personnel to potentially harmful particulate matter during the cleaning process.

The present disclosure is directed to various embodiments of a novel vacuum system for use in removing caustic particulate matter, e.g., caustic powders, that may be present in various environments, wherein such a system may avoid, or at least reduce, the effects of one or more of the problems identified above.

SUMMARY

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various embodiments of a novel vacuum system for use in removing caustic particulate matter, e.g., caustic powders, that are present in various environments. One illustrative system disclosed herein includes an upper filter, a lower filter positioned vertically below the upper filter, at least one incoming air inlet positioned vertically above the upper filter and a vacuum pump positioned vertically below the lower filter, the vacuum pump comprising an outlet, wherein an incoming air stream is adapted to flow downwardly through the at least one incoming air inlet, then through the upper filter, then through the lower filter and then out of the outlet of the vacuum pump where it exits as a cleaned air stream.

Another illustrative system disclosed herein includes a top lid, a pocket filter box positioned vertically below the top lid, wherein the top lid is operatively coupled to the pocket filter box, a pocket filter that is adapted to be removably positioned in the pocket filter box, and a plurality of incoming air inlets positioned in the top lid and above the pocket filter. In this example, the system also includes a HEPA filter box positioned vertically below the pocket filter box, a HEPA filter that is adapted to be removably positioned in the HEPA filter box via an opening in the HEPA filter box, and a HEPA filter door that is operatively coupled to the HEPA filter box, wherein the HEPA filter door is adapted to be moved from a first position to a second position, wherein, in the first position, the HEPA filter door covers the opening in the HEPA filter box and wherein, in the second position, the opening in the HEPA filter box is not covered by the lower filter door. This illustrative embodiment also includes a vacuum pump positioned vertically below the HEPA filter, the vacuum pump comprising an outlet, wherein an incoming air stream is adapted to flow downwardly through the at least one incoming air inlet, then through the pocket filter, then through the HEPA filter and then out of the outlet of the vacuum pump where it exits as a cleaned air stream.

BRIEF DESCRIPTION OF THE DRAWINGS

The disclosure may be understood by reference to the following description taken in conjunction with the accompanying drawings, in which like reference numerals identify like elements, and in which.

Figure 1:
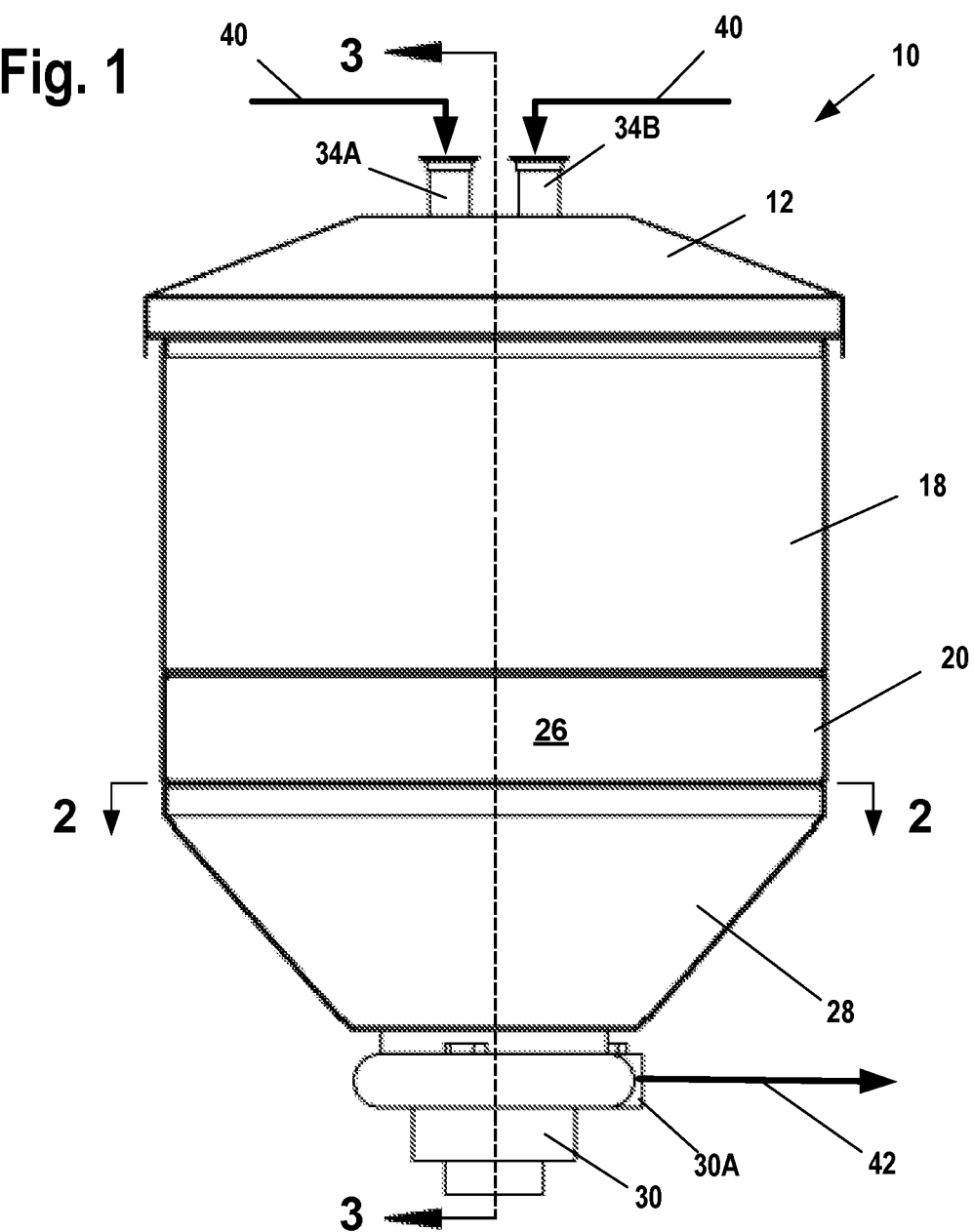
FIG. 1 is a frontal view of one illustrative embodiment of a novel vacuum system for use in removing caustic particulate matters that are present in various environments.
Figure 2:
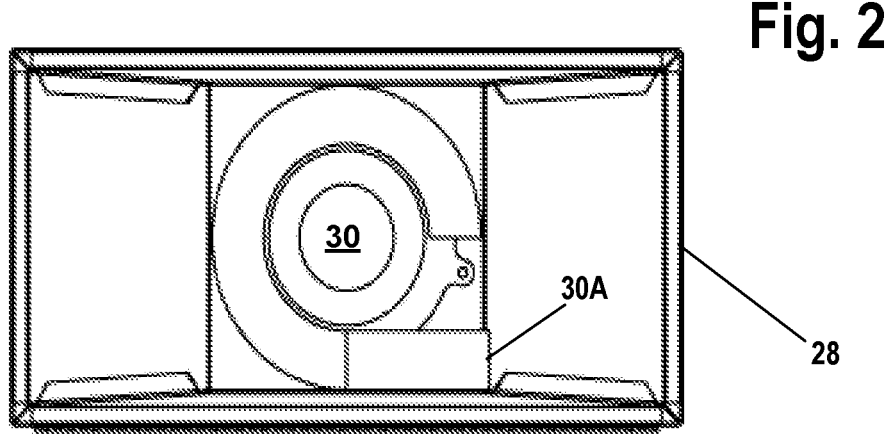
FIG. 2 is a plan view of a vacuum motor box and a vacuum motor of the illustrative vacuum system shown in FIG. 1.
Figure 3:
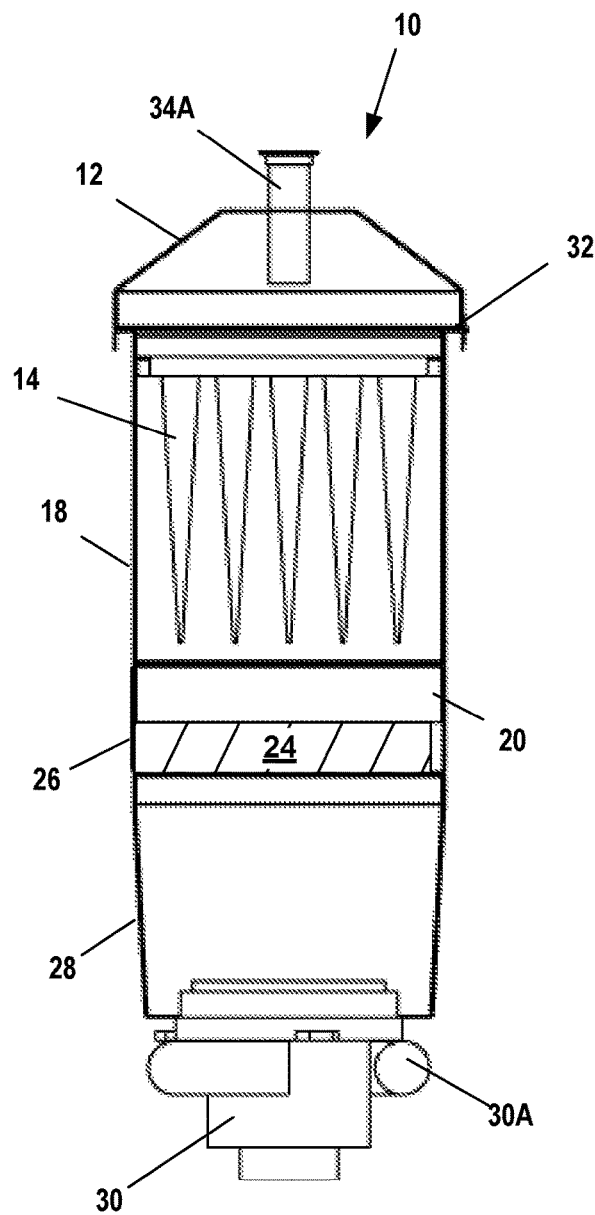
FIG. 3 is a cross-sectional view of the illustrative vacuum system taken where indicated in FIG. 1.
Figure 4:
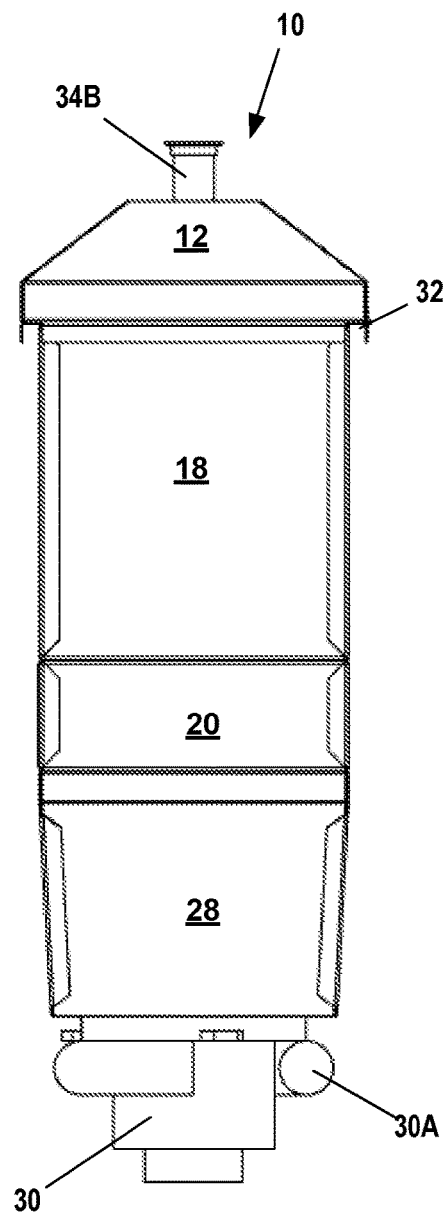
FIG. 4 is a side view of the illustrative vacuum system shown in FIG. 1.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIGS. 1-8 are various views of one illustrative embodiment of a vacuum system 10 (and its various components) that is adapted for use in removing caustic particulate matter, e.g., caustic powders, present in various environments. As depicted in these drawings, the vacuum system 10 comprises a top lid 12, an upper filter 14, an upper filter seal 16, an upper filter receptacle 18, a lower filter receptacle 20, a lower filter 24, a vacuum motor housing 28, a vacuum motor 30, a hinge 32 and a plurality of ambient air inlets 34A, 34B (collectively referenced using the numeral 34). Of course, as will be appreciated by those skilled in the art after a complete reading of the present application, the reference to an "air" stream or "ambient air" is used in a generic sense and not meant to imply or suggest the composition of any such stream, as the term "fluid" or "fluid stream" could equally be employed. For example, the system 10 disclosed herein may be employed to remove entrained particulate matter from any stream of gas irrespective of the composition of the gas.

As depicted, the top lid is operatively coupled to the upper filter receptacle 18 by the illustrative hinge 32. In the depicted example, the hinge 32 may take the form of a piano hinge. In the example depicted herein, the upper filter receptacle 18 takes the form of an upper receptacle box. The number and size of the ambient air inlets 34 may vary depending upon the particular application and the size of the overall system 10. In one illustrative embodiment, the system may comprise only a single ambient air inlet 34. In cases where the system 10 includes multiple ambient air inlets 34, all of the ambient air inlets 34 need not be the same size but that situation may occur in some applications. By use of two inlets 34, the system 10 provides operators with some operational flexibility. For example, one of the inlets 34 may be coupled to inlet piping or conduit (not shown), while an operator may couple a hose to the other inlet 34 so as to enable the operator to clean up locally the area around the system for particulate matter that may have fallen to the floor during operations such as filter replacement.

Figure 5:
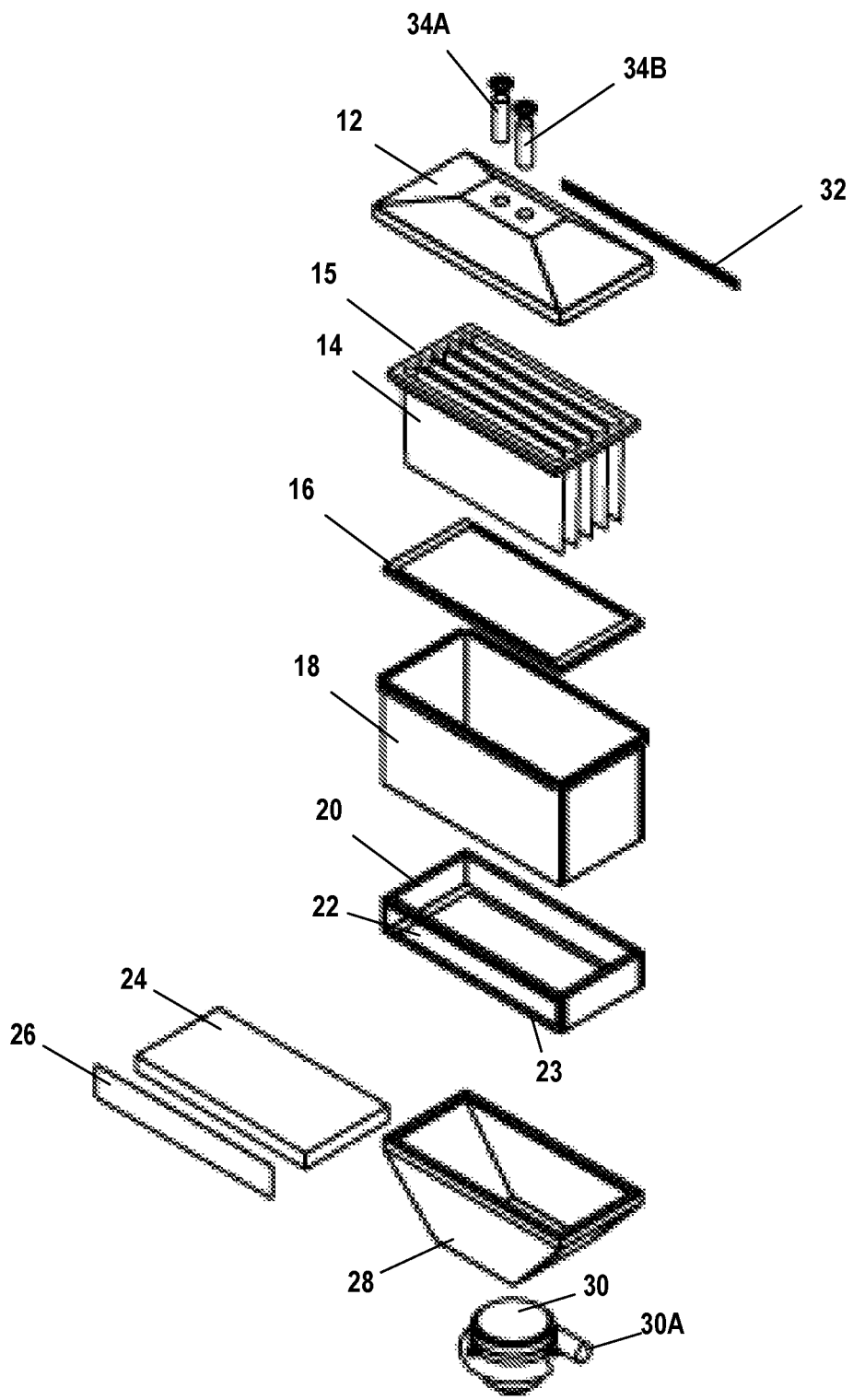
FIG. 5 is an exploded view of various components of the illustrative vacuum system shown in FIG. 1.
Figure 6:
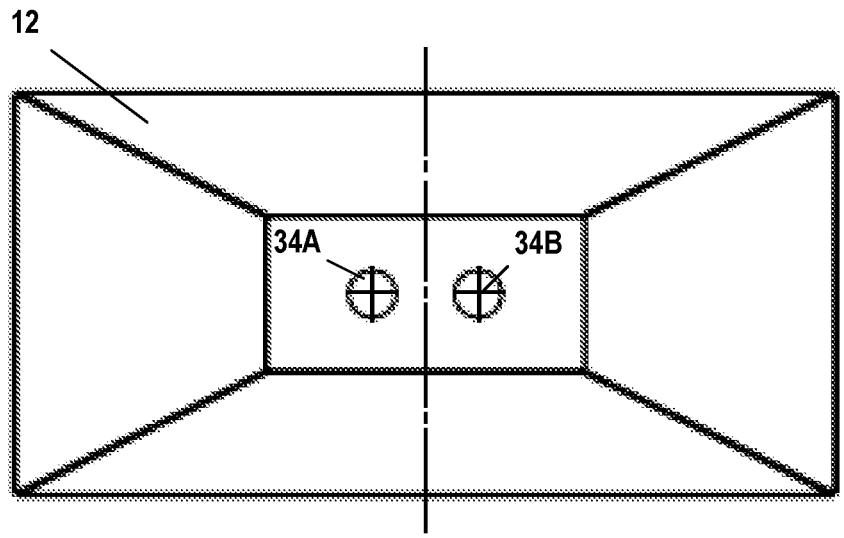
FIGS. 6, 7 and 8 are top, side and bottom views, respectively, of the illustrative top lid of the illustrative vacuum system shown in FIG. 1.
Figure 7:
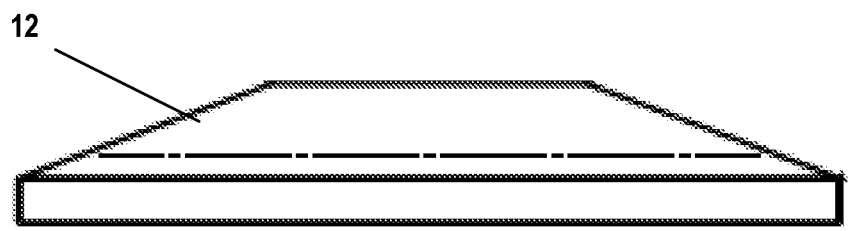
Figure 8:
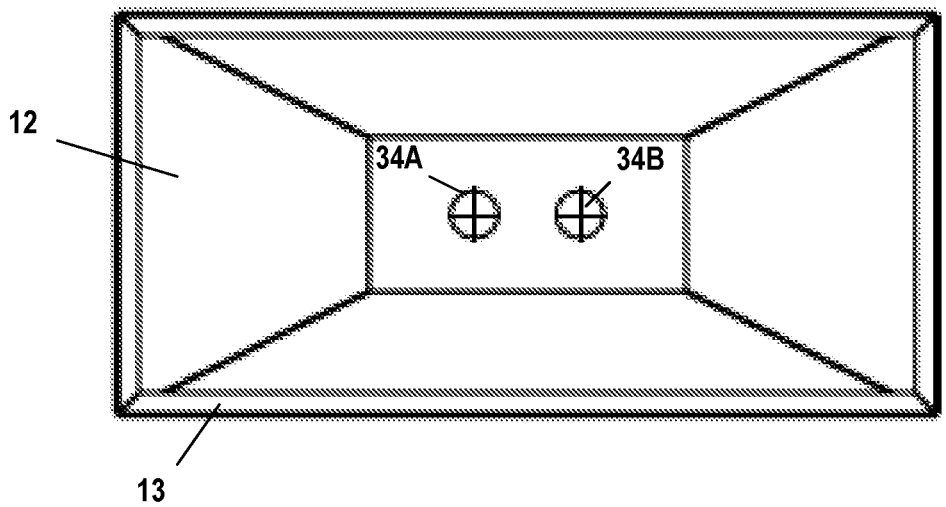

In one illustrative embodiment, the upper filter 14 may take the form of a pocket filter that is adapted to be removably positioned within the upper filter receptacle 18. If a pocket filter is used as the upper filter 14, relative to other types of filters, it typically provides more surface area and has more storage capacity as it relates to particulate matter that is filtered out of the air stream. As shown in FIG. 5, the system 10 also includes an upper filter seal 16 that is positioned between the upper filter 14 and the upper filter receptacle 18. With reference to FIGS. 5 and 8, in one illustrative embodiment, the system 10 may also include a rectangular-shaped seal (not shown) positioned between the bottom lip 13 of the lid 12 and the upper lip 15 of the upper filter 14.

Still referencing FIG. 5, in one illustrative embodiment, the lower filter receptacle 20 comprises an opening 22, wherein the lower filter 24 is adapted to be removably positioned within the lower filter receptacle 20 via the opening 22. In the illustrative example depicted herein, the lower filter receptacle 20 takes the form of a lower receptacle box. The system 10 also includes a lower filter receptacle door 26 that is operatively (e.g., hingedly) coupled to the lower filter receptacle 20 by one or more hinges (not shown). The lower filter receptacle door 26 is adapted to be moved from an open position (wherein the lower filter 24 may be inserted into or withdrawn from the lower filter receptacle 20) to a closed position (whereby the opening 22 in the lower filter receptacle 20 is blocked). With reference to FIG. 5, the system 10 may also include another rectangular-shaped seal (not shown) positioned between the outward facing lip 23 of the lower filter receptacle 20 and the lower filter receptacle door 26. In one illustrative embodiment, the lower filter 24 may take the form of a HEPA (High Efficiency Particulate Air) filter.

The vacuum motor 30 may be any type of motor that is capable of creating a vacuum sufficient to draw incoming particulate-containing ambient air 40 downward through the ambient air inlet(s) 34, through the upper filter 14, then through the lower filter 24 wherein it ultimately exits the vacuum motor exhaust or outlet 30A as cleaned air 42 that contains substantially less particulate matter than was present in the incoming ambient air 40. That is, the novel system 10 disclosed herein provides for a top-down flow of particulate-containing ambient air 40 sequentially downward through the upper filter 14 and the lower filter 24 whereby at least some of the particulate matter in the incoming ambient air 40 is removed by the combination of the upper filter 14 and the lower filter 24. The combination of the upper filter 14 and the lower filter 24 may be designed to remove particulate matter of any desired size. In one illustrative example, the cleaned air 42 that exits the system 10 may be substantially free of any entrained particulate matter.

The overall shape and configuration of the system 10 may vary depending upon the particular application. In the example depicted herein, the system 10 has a substantially rectangular box-type configuration, but other configurations are also possible. In one illustrative embodiment, to the extent practical, substantially all of the components of the system 10, other than the seals, the filters 14, 24 (and perhaps portions of the motor 30) that are exposed to the fluid (or air) as it passes through the vacuum system 10 may be made of a corrosion resistant metallic material. For example, all of the components of the vacuum motor 30 that will be exposed to the air as it passes through the system may be made of a stainless steel material. Such materials of construction permit the novel system 10 disclosed herein to be able to operate in and process (i.e., clean) air from relatively high-temperature environments, e.g., conditions where the ambient air 40 may be about 100° C. or greater. Of course, the system 10 may also be operated in less harsh environments that are at a lower temperature.

With respect to use of the system 10, in one illustrative example, the top lid 12 may be pivoted to an open position (not shown) so as to allow insertion of the upper filter 14 into the upper filter receptacle 18. The top lid 12 may then be pivoted to a closed position (shown in FIG. 1) thereby providing a seal between the top lid 12 and upper filter receptacle 18. In one illustrative embodiment, the lower filter receptacle door 26 may be pivoted to an open position (not shown) so as to allow insertion of the lower filter 24 into the lower filter receptacle 20. The lower filter receptacle door 26 may then be pivoted to a closed position thereby providing a seal between the lower filter receptacle door 26 and lower filter receptacle 20. Of course, the upper filter 14 and the lower filter 24 may be installed in any desired order, e.g., the lower filter 24 may be installed prior to the installation of the upper filter 14.

At that point, the vacuum motor 30 may be started so as to draw particulate-containing ambient air 40 into the system and down through the combination of the upper filter 14 and the lower filter 24 whereby it eventually exits the exhaust 30A of the vacuum motor 30 as a relatively cleaner air stream 42 that contains substantially less entrained particulate matter as compared to the amount of entrained particulate matter in the incoming particulate-containing ambient air 40. The system 10 may be employed to remove entrained solid particulate matter of any nature or character and of any size. In one particular example, the system 10 disclosed herein may be employed to remove high-temperature caustic powders that may be present in manufacturing facilities where integrated circuit products are manufactured.

Of course, as the system 10 is operated, particulate matter will be captured by the upper filter 14 and/or the lower filter 24 and the filters must be replaced. In one illustrative example, the upper filter 14 and the lower filter 24 may be changed on a regularly scheduled basis, e.g., once a week, as part of routine maintenance procedures. In other applications, the system 10 may also include various pressure sensors (not shown) to sense pressure levels at various locations within the system 10, e.g., above the upper filter 14 and above the lower filter 24. As the filters 14, 24 collect particulate matter, the pressure drop across the filter(s) will increase. Thus, the pressure levels sensed by these pressure sensors may be used to determine when one or both of the upper filter 14 and the lower filter 24 needs to be replaced. The steps performed to replace the filters 14, 24 would be the reverse to that described above for insertion of the filters 14, 24.

One advantage of the present system 10 is that it permits an operator to quickly change out the filters in the system 10. This is possible due to the relatively limited vertical height of the chamber above the upper filter, which means less internal area, e.g., the sidewalls, that need to be cleaned as part of the process of changing out the filters in the system.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. A system, comprising:
    an upper filter;
    an upper filter receptacle that is adapted to have the upper filter removably positioned therein;
    a top lid positioned vertically above the upper filter receptacle, wherein the top lid is pivotably coupled to the upper filter receptacle;
    at least one incoming air inlet positioned vertically above the upper filter, wherein the at least one incoming air inlet is positioned in and extends through the top lid;
    a lower filter positioned vertically below the upper filter;
    a lower filter receptacle that is adapted to have the lower filter removably positioned therein via an opening in the lower filter receptacle; and
    a lower filter door that is operatively coupled to a side of the lower filter receptacle and adapted to be moved from a first position to a second position, wherein, in the first position, the lower filter door covers the opening in the side of the lower filter receptacle and wherein, in the second position, the opening in the side of the lower filter receptacle is not covered by the lower filter door; and
    a vacuum pump positioned vertically below the lower filter, the vacuum pump comprising an outlet, wherein an incoming air stream is adapted to flow downwardly through the at least one incoming air inlet, then through the upper filter, then through the lower filter and then out of the outlet of the vacuum pump where it exits as a cleaned air stream.

2. The system of claim 1, wherein the at least one incoming air inlet comprises a plurality of incoming air inlets.

3. The system of claim 1, wherein the incoming air stream comprises entrained particulate matter at a first level and wherein the cleaned air stream comprises entrained particulate matter at a second level that is substantially less than the first level.

4. The system of claim 1, wherein the entrained particulate matter comprises caustic powder.

5. The system of claim 1, further comprising a vacuum motor housing, wherein an upper end of the vacuum motor housing is operatively coupled to a bottom of the lower filter receptacle and wherein the vacuum motor housing is operatively coupled to a lower end of the lower filter receptacle.

6. The system of claim 1, wherein the upper filter receptacle has a substantially rectangular configuration when viewed from above.

7. The system of claim 1, wherein the upper filter comprises a pocket filter and wherein the lower filter comprises a HEPA filter.

8. The system of claim 1, further comprising:
   a first seal positioned between a bottom of the top lid and an upper end of the upper filter receptacle; and
   a second seal positioned between an upper end of the lower filter receptacle and a lower end of the upper filter receptacle.

9. The system of claim 1, wherein the top lid, the upper filter receptacle and the lower filter receptacle are made of a stainless steel material.

10. A system, comprising:
    a top lid;
    an upper filter receptacle positioned vertically below the top lid, wherein the top lid is operatively coupled to the upper filter receptacle;
    an upper filter that is adapted to be removably positioned in the upper filter receptacle;
    an upper filter seal that is positioned between the upper filter and the upper filter receptacle;
    at least one incoming air inlet positioned in the top lid and above the upper filter, wherein the at least one incoming air inlet extends through the top lid;
    a lower filter receptacle positioned vertically below the upper filter receptacle, the lower filter receptacle comprising an opening;
    a lower filter that is adapted to be removably positioned in the lower filter receptacle via the opening in the lower filter receptacle;
    a lower filter door that is operatively coupled to a side of the lower filter receptacle, wherein the lower filter door is adapted to be moved from a first position to a second position, wherein, in the first position, the lower filter door covers the opening in the side of the lower filter receptacle and wherein, in the second position, the opening in the side of the lower filter receptacle is not covered by the lower filter door; and
    a vacuum pump positioned vertically below the lower filter, the vacuum pump comprising an outlet, wherein an incoming air stream is adapted to flow downwardly through the at least one incoming air inlet, then through the upper filter, then through the lower filter and then out of the outlet of the vacuum pump where it exits as a cleaned air stream.

11. The system of claim 10, wherein the at least one incoming air inlet comprises a plurality of incoming air inlets.

12. The system of claim 10, wherein the incoming air stream comprises entrained particulate matter at a first level and wherein the cleaned air stream comprises entrained particulate matter at a second level that is substantially less than the first level.

13. The system of claim 10, further comprising a vacuum motor housing, wherein an upper end of the vacuum motor housing is operatively coupled to a bottom of the lower filter receptacle and wherein the vacuum pump is operatively coupled to a lower end of the vacuum motor housing.

14. The system of claim 10, wherein the upper filter comprises a pocket filter and wherein the lower filter comprises a HEPA filter.

15. A system, comprising:
    a top lid;
    a pocket filter box positioned vertically below the top lid, wherein the top lid is operatively coupled to the pocket filter box;
    a pocket filter that is adapted to be removably positioned in the pocket filter box;
    a pocket filter seal that is positioned between the pocket filter and the pocket filter box;
    a plurality of incoming air inlets positioned in the top lid and above the pocket filter, wherein the plurality of incoming air inlets extend through the top lid;
    a HEPA filter box positioned vertically below the pocket filter box, the HEPA filter box comprising an opening in a side of the HEPA filter box;
    a HEPA filter that is adapted to be removably positioned in the HEPA filter box via the opening in the side of the HEPA filter box;
    a HEPA filter door that is operatively coupled to the HEPA filter box, wherein the HEPA filter door is adapted to be moved from a first position to a second position, wherein, in the first position, the HEPA filter door covers the opening in the side of the HEPA filter box and wherein, in the second position, the opening in the side of the HEPA filter box is not covered by the lower filter door; and
    a vacuum pump positioned vertically below the lower filter, the vacuum pump comprising an outlet, wherein an incoming air stream is adapted to flow downwardly through the at least one incoming air inlet, then through the pocket filter, then through the HEPA filter and then out of the outlet of the vacuum pump where it exits as a cleaned air stream.

16. The system of claim 15, further comprising a vacuum motor box, wherein an upper end of the vacuum motor box is operatively coupled to a bottom of the HEPA filter box and wherein the vacuum pump is operatively coupled to a lower end of the vacuum motor box.

17. The system of claim 15, wherein the top lid, the pocket filter box and the HEPA filter box are made of a stainless steel material.

* * * * *